June 8, 1971     L. O. STAFFORD     3,583,032
APPARATUS FOR CASTING MULTI-LAYER COMPOSITE FILM
Filed June 4, 1968     3 Sheets-Sheet 3
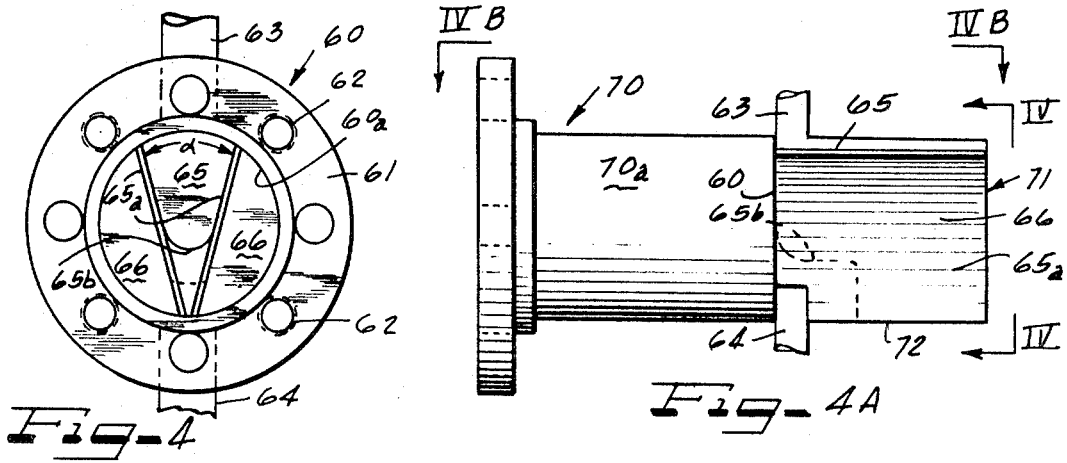
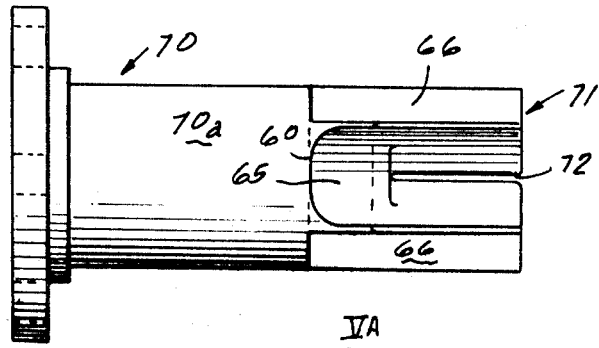
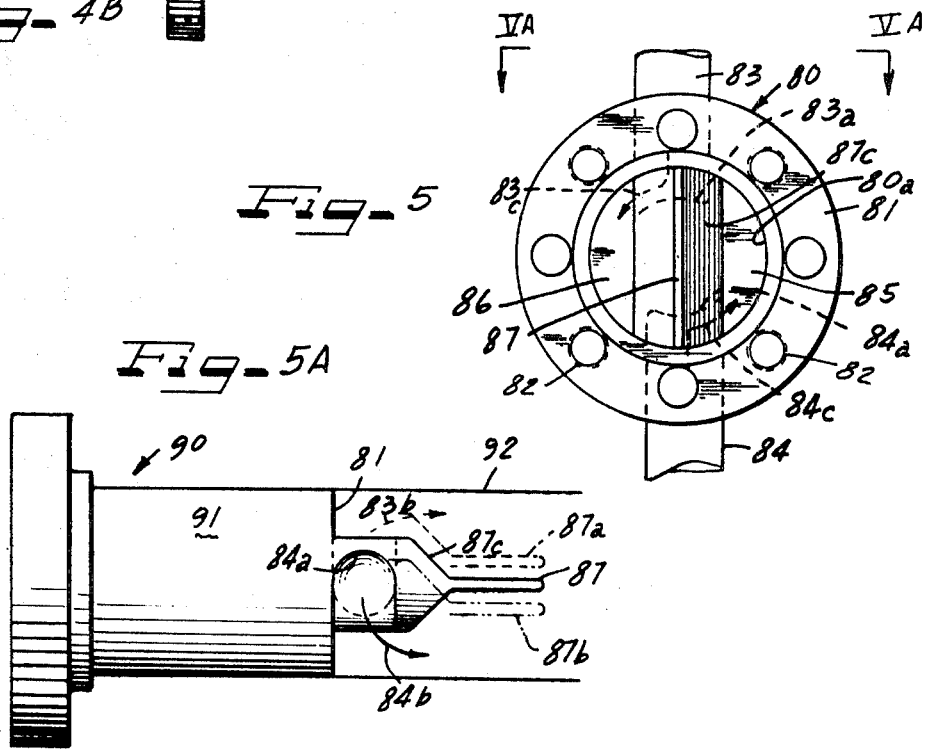
INVENTOR.
LARRY OWEN STAFFORD
BY *Hill, Sherman, Meroni, Gross, Simpson* ATTORNEYS United States Patent Office 3,583,032
Patented June 8, 1971

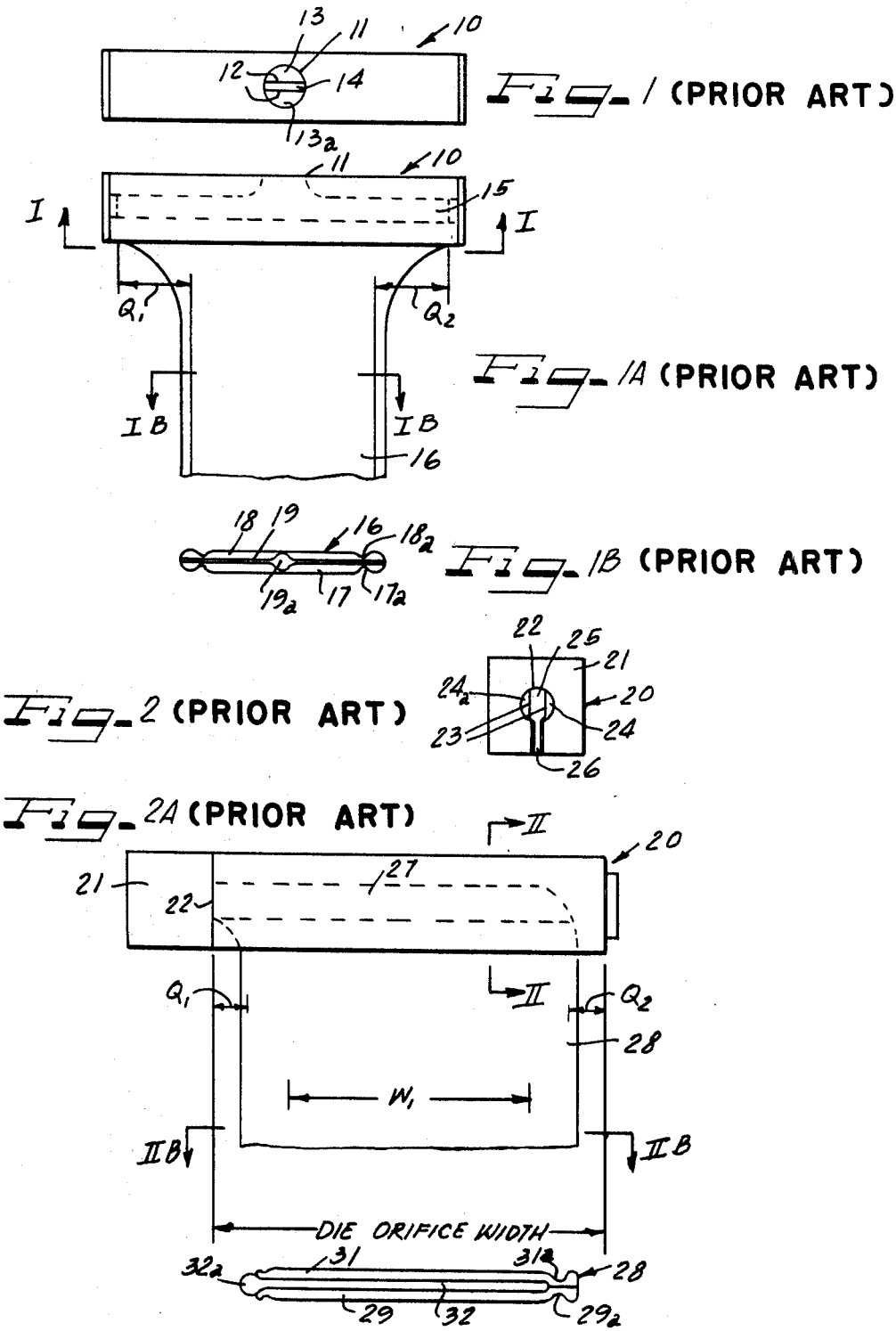

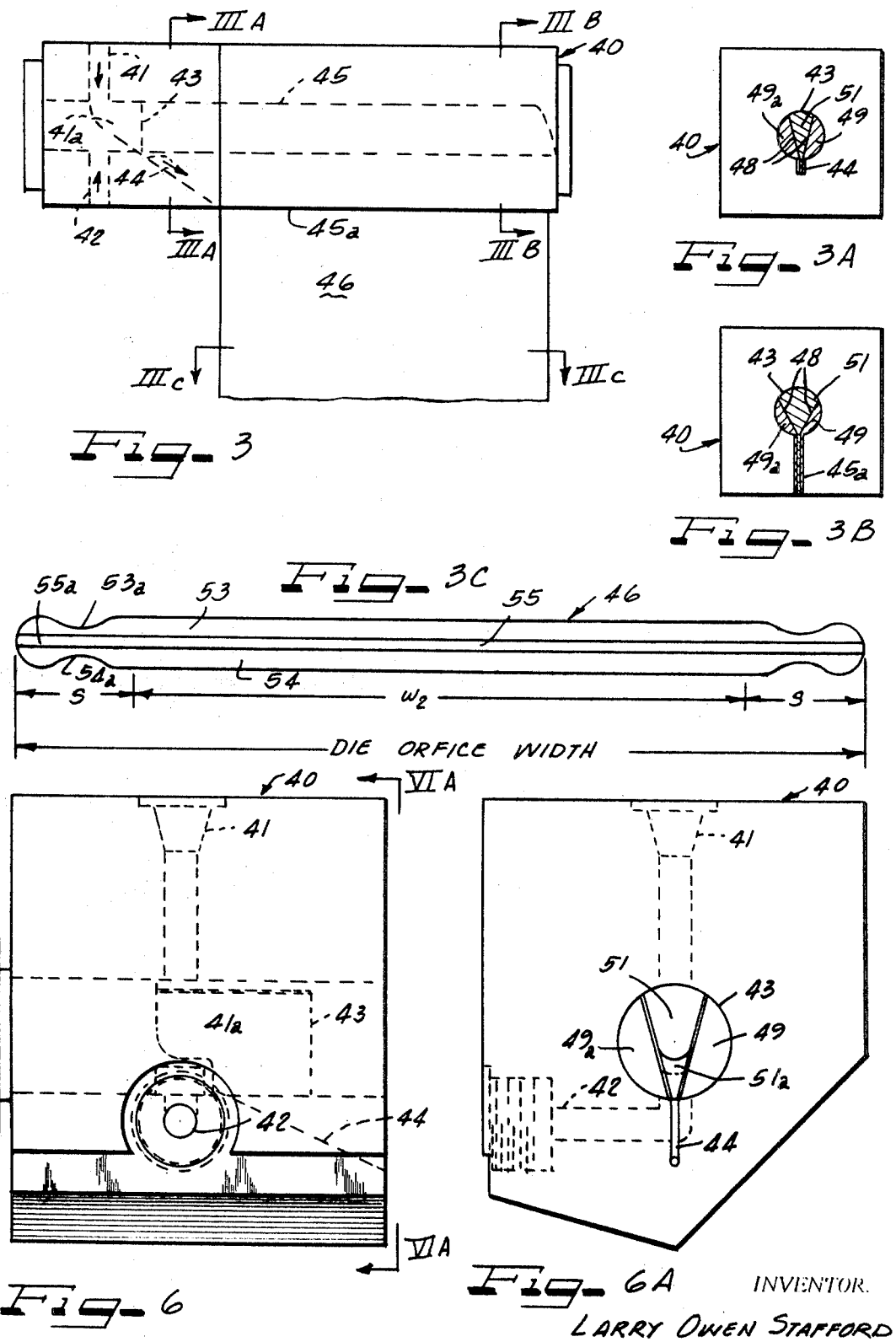

3,583,032
APPARATUS FOR CASTING MULTI-LAYER COMPOSITE FILM
Larry O. Stafford, South Beloit, Ill., assignor to Beloit Corporation, Beloit, Wis.
Filed June 4, 1968, Ser. No. 734,335
Int. Cl. B29f 3/00
U.S. Cl. 18—13
12 Claims

ABSTRACT OF THE DISCLOSURE

An end-feed die plug and inlet block for a plastic extrusion machine for casting multi-layer films. One embodiment of the die plug is a generally V-shaped guide means that receives a portion of the plastic melt into the enclosed portion thereof and another portion on the outside so that the first portion forms an inner layer and the other portions form surrounding outer layers of a composite multi-layer film. A second embodiment of the end-feed die plug is a predeterminably offset planar guide means directing plastic melts to a die means in preselected thickness ratios for a two-layer composite film. The inlet block is provided with one passageway feeding melt along a straight line path into the die means and another passageway feeding melt at an acute angle to the straight line path so that the plastic melt passing through the second passageway reaches the die outlet prior to the melt passing through the first pasasgeway.

---

The present invention relates to improvements in plastic film extruders and more particularly, to an end feed die plug inlet block arrangement for a multi-layer composite film extruder.

In a plastic extruder of the type conventionally used, the plastic material or melt is delivered along an extruder barrel by an extruder screw into an inlet and through a die plug into a die means for casting into a desired shape. One conventional type of die plug is a center-feed die which permits a limited degree of success but nevertheless has a number of substantial drawbacks. For example, when a center-feed die plug is utilized in extruding a three layer film, an uneven distribution of materials in the center layer results, yielding unwanted variations in the uniformity of physical characteristics of such a film. Another conventional type of die plug is an end-feed die plug which also exhibits a limited degree of success but also has a number of drawbacks. For example, while a conventional end-feed die plug produces a somewhat more even material distribution within a three layer film than a center-feed die plug, it fails to provide a uniform flow rate throughout an elongated die and thereby necessitates the utilization of relatively short die means producing relatively narrow film widths.

It is accordingly an object of the present invention to provide an improved end-feed die plug arrangement for a film extruder wherein relatively long die means can be utilized having substantially uniform material distribution in the formed multi-layer film and substantially uniform flow rates along all portions of the die means.

A further object of the invention is to provide an improved plastic melt delivery arrangement for an elongated die means using a novel end-feed die plug and inlet block to obtain substantially uniform flow rates along the die means.

Still another object of the invention is to provide an improved end-feed die plug which is readily removable and exchangeable for another end-feed die plug without the necessity of cleaning the die and extruder apparatus.

Yet another object of the present invention is to provide an improved end-feed die plug for use with a die means in an extruder producing a tri-layer composite film having a substantially uniformly formed center layer and outer layer of relatively greater width than heretofore possible.

A still further object of the invention is to provide an improved end-feed die plug for use with a die means in an extruder producing a two-layer composite film having substantially uniform material flow rates along the die means.

Other objects, advantages and features will become more apparent with the teachings of the principles of the preferred embodiments thereof in the specification, claims and the drawings, in which:

FIG. 1 is a diagrammatical end view taken substantially along line I—I of FIG. 1A illustrating a conventional center-feed die plug and die means;

FIG. 1A is an essentially diagrammatical side view of the center-feed die plug, die means and the film formed thereby;

FIG. 1B is a diagrammatical cross-sectional view taken substantially along lines IB—IB of FIG. 1A illustrating a portion of the film;

FIG. 2 is an essentially diagrammatical elevational side view taken substantially along line II—II of FIG. 2A illustrating the conventional end-feed die plug and die means;

FIG. 2A is an essentially diagrammatical elevational side view of a conventional end-feed die plug, die means and film formed thereby;

FIG. 2B is a diagrammatical cross-sectional view taken substantially along lines IIB—IIB of FIG. 2A illustrating a portion of the film;

FIG. 3 is an essentially diagrammatical elevational view, with parts in phantom, illustrating a portion of a film extruder constructed and operated in accordance with the principles of the instant invention;

FIG. 3A is a diagrammatical end view taken substantially along lines IIIA—IIIA of FIG. 3 illustrating a portion of the plastic melt flow path within the die means;

FIG. 3B is a diagrammatical end view taken substantially along lines IIIB—IIIB of FIG. 3 illustrating a further portion of the plastic melt flow path within the die means;

FIG. 3C is a diagrammatical cross-sectional view taken substantially along lines IIIC—IIIC of FIG. 3 illustrating a portion of the composite film flow in accordance with the principles of the present invention;

FIG. 4 is an essentially diagrammatical elevational front view taken substantially along lines IV—IV of FIG. 4A, illustrating an embodiment of the end-feed die plug of the present invention;

FIG. 4A is an essentially diagrammatical elevational side view of a portion of a plastic film extruder constructed and operating in accordance with the principles of the present invention;

FIG. 4B is an essentially diagrammatical top view taken substantially along lines IVB—IVB of FIG. 4A illustrating additional features of the plastic film extruder of the present invention;

FIG. 5 is an essentially diagrammatical front view, with parts on phantom, illustrating another embodiment of the end-feed die plug of the present invention;

FIG. 5A is an essentially diagrammatical elevational side view taken substantially along lines VA—VA of FIG. 5 illustrating a portion of the plastic film extruder constructed and operating in accordance with the principles of the instant invention;

FIG. 6 is an essentially diagrammatical side view, with parts in phantom, illustrating the plastic melt feed system within a portion of an inlet block constructed and operating in accordance with the principles of the instant invention; and FIG. 6A is an essentially diagrammatical front view with parts in phantom, taken substantially along lines VIA—VIA of FIG. 6 illustrating additional features of the plastic melt feed system within an inlet block of the present invention.

As shown in the drawings:

FIG. 1 illustrates die means 10 having a center-feed end plug 11 substantially in centroidal position of an elongated die means 10 feeding plastic melt to said die means 10. The center-feed plug 11 is provided with two substantially parallel guide means 12 which divide die plug 11 into two outer chambers, 13 and 13a respectively, and an inner chamber 14. Plastic melt coming from appropriate supply source is segmented into the respective chambers and thereby forms a multi-layered film.

The mechanics of delivering a plastic melt to a die plug is well understood in the art and need not be explained further.

FIG. 1A shows a die means 10 having a center-feed plug 11 substantially as explained hereinbefore which allows the tri-layer film to expand into an elongated die slot 15 and exit therefrom to form a film 16. $Q_1$ and $Q_2$ designate the flow of plastic from the respective ends of the die slot 15 to a point where the curved edges of the film approach asymptotically to a line perpendicular to the orifice of the die means. These flow rates are utilized to determine the suitability of any particular type die in producing a useable film and will be explained hereinafter in greater detail.

FIG. 1B shows a cross-sectional view of a portion of the film formed by a center-feed die plug, such as illustrated at FIG. 1. The film 16 has one outer layer 17 and another outer layer 18 with a center layer 19 therebetween. Layers 17 and 18 are generally the same material while layer 19 may be the same material or it may be of a different material. As will be noted, the ends of the formed film produce dimples 17a and 18a respectively in their particular layers and produce a bulge 19a in the centroidal portion of center layer 19. Of course, to produce a useable film, the same must be trimmed to exclude the dimples 17a and 18a, however, there is no such simple mechanical means for correcting the bulge 19a, which of course produces undesirable variations in the physical characteristics of the film. Thus, while a center-feed die produces substantially uniform flow rates $Q_1$ and $Q_2$, it fails to provide a uniform distribution of material and is therefore generally considered to be inferior to an end-feed die plug.

As indicated hereinbefore, it is important that the flow rates $Q_1$ and $Q_2$ are substantially equal to each other in order to achieve a uniform product. The ratio of $Q_2$ to $Q_1$ is generally known as the uniformity index E. Uniformity index E must be greater than or at least equal to 0.98 in order to have a commercially acceptable cast film. If such standards are not adhered to, undesirable wrinkles or variations in film thickness develop. As might be expected from the physical configurations, the center-feed die generally has a higher uniformity index than an end-feed die of equal length, if all other factors are also equal. In fact, a center-feed die could theoretically be twice as long as an end-feed die and still have the same uniformity index. However, because of the non-uniformity of the sheet produced with a center-feed die, and end-feed die is preferred, even though a shorter die must be utilized in order to bring the uniformity index within the desired limits.

FIG. 2 illustrates a conventional die means 20 having a housing 21 which is adapted for mounting a conventional end-feed die plug 22 therein. The end-feed die plug 22 is provided with two substantially parallel and vertical guide means 23 segmenting the die plug 25 into outer chambers 24 and 24a and an inner chamber 22 with all said chambers communicating with an outlet slot 26.

FIG. 2A shows a side elevational view of die means 20 having housing 21 and end-feed die plug 22 mounted therein. End-feed die plug 22 feeds plastic melt into an elongated passageway 27. Passageway 27 forms a chamber within die means 20, which chamber feeds the plastic melt down through a die slot (not shown). The plastic melt exists from the die slot and forms a film 28, and, as will be noticed, the flow rates $Q_1$ and $Q_2$ are not equal. In order to produce a substantially useable film with this type of die plug, it is necessary to trim the film 28 to a width $W_1$ to eliminate the various material unevenness within the composite film. As will be noticed, only about 70% of the cast width is actually utilizable.

FIG. 2B shows a cross-section of the cast film 28 having outer layers 29 and 31 and an inner layer 32. It will be noted that dimples 29a and 31a are formed only on the far side of the film and that the near side of the film produces a bead 32a. The central portion of the film is substantially uniform. In order to reduce all variations within this film it is necessary to trim off a substantial portion thereof, so that much waste and relatively narrow film widths result.

FIG. 3 generally illustrates the inlet portion and die means of an extruder 40 utilizing the principles of the instant invention. Extruder 40 is provided with a first supply 41 and a second supply means 42 feeding plastic melt from an appropriate source (not shown) to an inlet chamber 41a. The plastic melt in passages 41 and 42 may be the same or may be different either in chemical composition or in physical characteristics, i.e. have different optical properties, such as color. The actual plastic materials utilized to form the film can be any conventional thermoplastic materials such as, for example polypropylene and polyethylene. As is well known, polypropylene is more abrasion resistant while polyethylene is more flexible so that by a proper combination of various thickness of these two materials a wide variety of useable film can be obtained. The proportionate thickness of the inner and outer layers of a particular film are varied in accordance with the ultimate use of that film. Common uses for such composite film is in pouches for frozen foods which are prepared by dropping the plastic pouch into boiling water, packaging for hard candy, bread, wrappers, etc.

The plastic melt within inlet chamber 41a does not actually intermix but forms separate layers thereof which are forced through a die plug 43 in the direction of the arrows shown. Die plug 43 has a guide means 65a, 65b (best seen at FIG. 4) separating the plastic melt into three individual contiguous layers or streams (best seen at FIGS. 3A and 3B), which are fed out toward cross machine straight line die passageway 45 and out of the die opening 45a to form a composie film structure 46. As will be noted, a portion of the material leaving the end-feed die plug 43 also exits out of a relatively short outlet feed passageway 44, which is at an acute angle to the straight-line passageway 45 so that the material exiting through passageway 44 reaches slots 45a prior to the material exiting from the straight line passageway 45. This is an important feature of the invention as it eliminates the formation of undesirable beads, such as shown at 32a in FIG. 2B which result from conventional inlet blocks and die plugs. As will be appreciated, the plastic melt is simultaneously forced along a straight line substantially commensurate with the machine width of the die passageway 45 and then downwardly along the machine length thereof through the slot opening 45a so that the plastic melt within die passageway 45 continuously has two forces exerted against it, i.e. the cross-machine force feeding new plastic melt into the chamber and the downward force forcing the plastic melt out of the die slot 45a. Both of these flow rates must be substantially equal in order to achieve uniform flow rate and uniform distribution of materials within the composite film.

The unique die plug of the instant invention provides flow paths which readily achieve such uniform flow rates and material distribution within the composite film. FIG. 3A illustrates the plastic flow streams, in cross-section immediately after passing end-feed die plug 43. It will be noted that the center stream or layer 51 is generally V-shaped and has a cross-sectional axes along the upper portion thereof greater than cross-sectional axes of the outer streams or layers 49 and 49a at a similar location. The continuous boundaries of layers 49, 51, and 49a, 51 respectively of the plastic melt are generally tapered downwardly by an exemplary form of guide means 48 toward the slot opening and the angular outlet feed passageway 44. The angular passageway 44 allows the materials along the outer layers 49 and 49a to reach the die slot 45a somewhat prior to the central layer 51 reaching the die slot 45a. As the material progresses downwardly i.e. along the machine length) along die passageway 45 of FIG. 3, the center layer 51 expands along its upper portions (best seen at FIGS. 3A and 3B) thereof in response to the pressure forces acting on it and insures that sufficient material is present in the center layer 51 when it reaches the far end of the die passageway 45 and thereby enables it to form a uniform layer in the composite film 46.

The outer layers 49 and 49a are forced into smaller cross-sectional areas within the die passageway and are therefore also forced out of die slot 45a uniformly along the die axes. The V-shaped configuration of the central melt flow path insures that the material in the center portion maintains sufficient pressure enabling it to uniformly exit through the length of the die slot. It will thus be seen that supply means 42 feeds a plastic melt at a rate somewhat greater than the rate of material fed by feed means 41 and that the ratio of cross-sectional areas of the V-shaped flow stream is somewhat less, at least initially, than the cross-sectional area of the flow streams surrounding said V-shaped flow and stream. In other words, the ratio of cross-sectional areas of the V-shaped flow stream to the cross-sectional area of the flow streams surrounding said V-shaped flow stream is somewhat less than the ratio of volume flow rates of material being supplied from the first feed means 41 feeding said V-shaped flow path to that being supplied by the second feed means 42 feeding the outer flow streams somewhat surrounding the V-shaped flow streams.

FIG. 3C illustrates a cross-sectional view of the composite film 46 formed in accordance with the instant invention. The film 46 has outer layers 53 and 54 and an inner layer 55 which is substantially uniformly distributed throughout the width of the film, including at ends 55a thereof. It will be noted that the outer layers 53 and 54 maintain their dimples 53a and 54a respectively but that such dimples are less severe than that produced by the prior art methods. As indicated on the drawings, the outer boundaries of the film substantially coincide with the die orifice width. In accordance with the principles of the instant invention, it is possible to utilize substantially greater width dies with end-feed die plugs than heretofore possible. A preferred width of a die is 54 inches, although other die widths may also be useable. The portion S at either end of the film 46 is trimmed and scrapped as waste, however, this only amounts to approximately 5 to 10% of the overall film width so that a useable portion $W_2$ equals 80 to 90% of the cast film width. For general purposes, a composite film structure of this type is cast with an overall thickness of approximately 1 mil, which overall thickness is, of course, divided between the three layers in accordance with the desired properties of the film. Thus, for example, when producing a composite film having an outer layer of polyethylene and a center layer of polypropylene for use as boiling pouch material for packaging frozen foods, a suitable end-feed die plug of the invention is selected (or adjusted) to provide a thickness ratio of the layers substantially equal to 0.5:2.0:0.5. When such a composite film is produced for use as a hard candy packaging material, a different end-feed die plug is selected (or adjusted) to provide a thickness ratio of the layer substantially equal to 0.5:1.5:0.5 and if such a composite film is intended for use as a bread wrapping material, a further end-feed die plug is selected (or adjusted) to provide a thickness ratio of the layers substantially equal to 0.1:0.8:0.1.

FIG. 4 illustrates an end-feed die plug 60 of the instant invention capable of handling two incoming streams of plastic melt to produce a composite film consisting of an inner layer of one plastic surrounded on either side by a layer of another plastic. The end-feed die plug 60 comprises a housing means 61 having a plurality of fastening means 62 adapted for mounting on an inlet block (not shown) as to be secured thereto and has an inner chamber 60a. A first feed means 63 and a second feed means 65 are disposed to feed plastic melt to substantially opposed sides of the die plug 60. Divergent melt guide means or vanes 65a are mounted within the chamber 60a to segment or divide chamber 60a into a plurality of passageways. The first or central melt or passageway 65 defines a first inlet means generally centrally feeding plastic melt into a die chamber means (not shown) tapered toward the outlet slot of such die chamber means while the outer passageways 66, 66 define a second inlet means feeding plastic melt to the die chamber means generally around the central passageway 65. It will be noted that the central passageway or first inlet means 65 communicates only with the first feed means 63 while outer passageways 66, 66 communicates with only the second feed means 64. Vane means 65a are provided with a throat stop means 65b preventing material in chamber 65 from passing therethrough.

As will be appreciated, the material is first fed into passageways 65 and 66 until these passageways are completely filled and then the continued forced feeding forces the plastic melt in such passageways to pass in a plane generally perpendicular to the plane of the drawing and occupy the width of a die chamber within a die means (not shown) and then exit through a die opening slot therein. The divergent vane means 65a generally form a V-shaped gate within the chamber 60a and are substantially rigid. It is contemplated that a plurality of such end feed die plugs are provided so that each die plug has divergent guide surfaces 65a that define a larger angle $\alpha$ therebetween, and such angle $\alpha$ ranges from about 15° to about 135°, thereby allowing an end user to preselect a particular die plug suitable for the thickness ratio of the layers in a selected film. The divergent vane means preferably define substantially equidistant chords and define a plurality of inlet chambers within the chamber 60a. In addition, it will be noted that the cross-sectional area of the central passageway or inlet means 65 is somewhat smaller than the total cross-sectional area of the outer passageways 66 but that the central passageway has a larger cross-sectional axis than the outer passageways. By this arrangement it is possible to provide somewhat greater fluid pressure with the upper portion of the central plastic melt than along similar upper portions of the outer plastic melt thereby forcing the outer plastic melt toward the outlet slot of a die means at a constant rate while allowing the central plastic melt to gradually expand into a greater cross-sectional area. Thus, when a greater volume flow rate of plastic melt is fed into the central passageway 65 than to the outer passageways, the fluid pressure is further increased and allows the central plastic melt to occupy the central portion of a die slot along its entire length and thereby exit as a substantially uniform central layer in a composite film. In other words, the ratio of the cross-sectional area of the central inlet means 65 to the cross-sectional area of the outer inlet means 66 is less than the ratio of volume flow rates in the central inlet means or passageways 65 to the volume flow rate in the outer passage 66.

Referring now to FIG. 4A wherein an inlet block means 70 having an elongated die means 71 attached to a housing 70a is illustrated. Die means 71 is provided with an elongated bottom outlet slot 72 which communicates with the interior of the die means 71. The die means 71 is likewise provided with a first inlet passageway 63 and a second inlet passageway 64 feeding molten, normally solid thermoplastic resins or plastics which may or may not be the same depending upon the particular type film being cast. The die means 71 is also provided with an end-feed die plug 60 substantially similar to that explained hereinbefore. Die plug 60 has a centrally disposed passageway 65 directing the plastic from feed means 63 into the centroidial position within die means 71 and out opening 72. The die plug 60 is likewise provided with outer passageways 66 directing the plastic melt from feed means 64 into surrounding relationship around the plastic being fed out of feed means 63. The housing 70a is of conventional structure and need not be described further.

Referring now to FIG. 4B wherein a top view of the inlet means 70 is illustrated. Inlet means 70 is provided with a housing 70a having an elongated die means 71 attached thereto. Die means 71 is provided with a bottom outlet slot 72 for casting various thicknesses of film. An end-feed die plug 60 is provided between the housing 70a and the die means 71 in order to segment or divide various plastic melts into separate layers so that a composite multi-layer film may be cast. The end-feed die plug 60 is provided with outer passageways 66 and an inner passageway 65 for producing a three-layered film. It might be pointed out that die means 71 is of relatively short cross-machine width as substantially no waste occurs in the casting of multi-layered films, i.e., very little trim needed since non-uniform beads and the like are avoided whereby substantially the entire width of the cast film may be utilized.

FIG. 5 illustrates another embodiment of an end-feed die plug 80 of the instant invention capable of handling two incoming streams of plastic melt to produce a two-layered composite film structure having pre-selected thickness ratios of one plastic melt to the other. The end-feed die plug 80 comprises a housing means 81 having a plurality of fastening means 82 adapted for mounting on an inlet block (not shown) as to be secured thereto. The end-feed die plug 80 has an inner chamber 80a receiving two different plastic melts (although they could be the same) from a first feed means 83 and a second feed means 84 feeding plastic melt into the chamber 80a from opposed ends thereof. Feed means 83 is provided with a feed inlet means 83a directing plastic melt substantially along the line of the dotted arrow 83c so that the melt entering through feed means 83 enters chamber 80a along one side thereof. Feed means 84 is likewise provided with an opposing feed inlet means 84a directing the plastic melt therein along a path indicated by the dotted arrow 84c whereby the plastic melt in feed means 84 enters into the substantially opposed portion of chamber 80a. Interior chamber 80a is substantially equally divided by a centralized offset vane or guide means 87. Vane means 87 is provided with a base 87c mounted on an inlet block means (not shown) and the vane means 87 is offset a desired degree to provide a predetermined thickness relationship between the two plastic melts. Thus, vane means 87 divides the chamber 80a into a plurality of passageways 85 and 86.

As shown in FIG. 5A the offset vane means 87 may be preset in a particular location, such as shown at 87a and 87b to vary the ratio of one plastic melt to the other. As illustrated, a conventional (or one in accordance with the principles of the instant invention) inlet block 90 is provided with an inlet block housing 91 and a die means 92. Mounted between the inlet block housing 91 and the die means 92 is the end-feed die plug 81. End-feed die plug 81 has an offset vane 87 mounted on appropriate base 87c having a feed inlet means 84a directing one plastic melt along the path indicated by 84b and another feed inlet means (not shown) directing the plastic melt along a path 83b as indicated by the dotted arrow. Of course, it will be appreciated that feed inlet means 84a and 83b may be reversed so as to feed in opposing directions from that shown in the drawing, i.e. feed inlet means 84a may be adjusted to feed into the upper portion of the die means 92 while feed inlet means 83b may be adjusted to feed into the lower portion. Likewise, the guide means 87 may be offset in any desired position to yield an 80–20% thickness ratio or a 20–80% thickness of one plastic material to another as desired. It is contemplated that a plurality of such offset die plugs be provided for any desired ratio of the plastics utilized.

As will be appreciated, the end feed die plug means 80 can be readily and easily removed without the necessity of cleaning out the entire extrusion apparatus or even the inlet block and one of the alternative embodiments such as shown in FIG. 4, of the die plug may be inserted allowing efficient and rapid transfer from a two-layer film manufacturing process to a three-layer film manufacturing process. There is no need to clean out the die means or the inlet block as the unique end feed die plugs of the instant invention readily segment a two melt flow stream into a two-layer or three-layer film as dseired.

Referring now to FIG. 6 wherein an essentially side view of the inlet block is shown. The inlet block has a housing 40 provided with a first feed means 41 and a second feed means 42 feeding two different or the same plastic melts into an inlet chamber 41a wherein such different plastic melts form a segmented plastic melt system which is forced through an embodiment of an end-feed die plug 43 substantially as explained hereinbefore. FIG. 6A illustrates the front view of the inlet block 40 and it will be noted that the first feed means 41 feeds into the upper portion of end-feed die plug 43 (substantially similar to the embodiment illustrated at FIG. 4) into the central or first passageway 51 while the second feed means 42 feeds material substantially around the central passageway 51 into the outer passageways 49, 49a. Central passageway 51 is provided with a throat stop means 51a preventing the material from feed means 42 from entering such first passageway 51 and at the same time, preventing the material from feed means 41 from entering the outer passageways 49, 49a. The inlet block 40 is also provided with a relatively short sloping outlet feed passageway 44 substantially as explained in connection with FIG. 3 to allow the material along the outer passageways 49, 49a to reach the outlet slot of the die means (not shown) at substantially the same time that the material from the central passageway 51 reaches said outlet slot. In this manner, substantially uniform layers of plastic melt are formed substantially along the entire die means width so that a greater proportion of such film is useable and substantially less trim is required.

Thus, it will be seen that I have provided an improved end-feed die plug and inlet block means for use with a plastic extruder which meets the objectives and advantages above set forth. The mechanism utilizes an advantageous end-feed die plug and inlet block to provide a more uniform multi-layer film structure which are readily adjustable for a wide variety of films, provide ease of change over and maintenance and provides advantages over structures heretofore available.

The drawings and specification present a detailed disclosure of the preferred embodiments of the invention, and it is to be understood that the invention is not limited to the specific forms disclosed but covers all modifications, changes and alternative constructions and methods falling within the scope and spirit of the principles of the invention.

I claim as my invention:
1. An end-feed die plug means for mounting in a plastic extrusion apparatus at a plastic melt inlet end of an end-feed die means, said die means having a desired width and an outlet slot extending in a cross-machine direction for extrusion of a film, comprising: a housing means having interior peripheral walls defining an interior chamber in fluid communication with said inlet end of said die means, a first plastic melt feed means providing fluid communication to a first portion of said interior chamber, a second plastic melt feed means providing fluid communication to a second portion of said interior chamber, said first and second portions of said interior chamber being spaced from one another, means supplying a plastic melt to said first and second plastic melt feed means, and a guide means positioned within said interior chamber in surface contact with at least a portion of said interior peripheral walls and between said first and second portions thereof to segment said chamber into at least two distinct plastic melts flow passageways, said passageways guiding the plastic melt from said first and second plastic melt feed means in adjacent contiguous flow streams along the width of said die means and toward said outlet slot, whereby the plastic melt from the first plastic melt feed means forms a first substantially uniform layer and the plastic melt from the second plastic melt feed means forms a second substantially uniform layer of a multi-layer composite film.

2. An end-feed die plug means as defined in claim 1 wherein the guide means is positioned between the first and second portions of the interior chamber to segment said chamber into three distinct plastic flow passageways, said passageways guiding the plastic melt from the first and second melt feed means into adjacent contiguous flow streams along the width of the die means and toward the outlet slot whereby the plastic melt from the first plastic melt feed means forms a central substantially uniform layer and the plastic melt from the second plastic melt feed means forms a first outlet substantially uniform layer on one surface of said central layer and forms a second outer substantially uniform layer on an opposite surface of said central layer so as to form a multi-layer composite film.

3. An end-feed die plug means as defined in claim 2 wherein the guide means comprise a substantially V-shaped gate positioned within the interior chamber so that the first plastic melt feed means is positioned between the divergent portions thereof and the second plastic melt feed means is positioned substantially opposite the apex thereof.

4. An end-feed die plug means as defined in claim 3 wherein the V-shaped gate means defines an angle between the divergent portion thereof that is substantially in the range of 15° to 135°.

5. An end-feed die plug means as defined in claim 1 wherein the guide means segments the interior chamber into plastic melt passageways having pre-selected cross-sectional areas that regulate the thickness of the plastic melts within each of said passageways.

6. An end-feed die plug means as defined in claim 1 wherein the guide means is positioned to segment the interior chamber into a central plastic melt passageway and two outer plastic melt passageways having substantially equal cross-sectional areas, each spaced along opposite sides of said central passageway, said central passageway having a somewhat larger cross-sectional area than the cross-sectional area of each of said outer passageway.

7. In a plastic film extrusion apparatus having an end-feed die means with an outlet slot extending a desired width in a cross-machine direction and a plastic melt supply feed means feeding a plurality of plastic melts, and end-feed die plug means mounted on an inlet end of said die means comprising, a housing having interior peripheral walls defining an interior chamber in fluid communication with said inlet end of the die means, a plurality of spaced apart melt feed means, each positioned to interconnect one of said plurality of plastic melts with a plurality of spaced apart portions of said interior chamber, and a guide means positioned within the interior chamber between said plurality of spaced apart portions thereof in surface contact with at least portions of said interior peripheral walls to segment said chamber into a plurality of distinct melt flow passageways, said melt flow passageways guiding the plastic melts from said plurality of melt feed means in adjacent contiguous flow streams along said die means and toward said outlet slot whereby each of said melts forms a substantially uniform layer of a multilayer film.

8. In a multi-layer plastic film extrusion apparatus as defined in claim 7 wherein the guide means is selectively positioned within the interior chamber to predetermine the cross-sectional area of each of the plurality of melt flow passageways.

9. An end-feed die plug means for mounting in a plastic extrusion apparatus at a plastic melt inlet end of an end-feed die means, said die means having an outlet slot extending in a cross-machine direction and having a longitudinal axis parallel to said direction for extrusion of a multi-layer composite film of a desired thickness, comprising, a housing means having interior peripheral walls defining an interior chamber in fluid communication with said inlet end of the die means, a first plastic melt feed means attached to said housing means and providing a fluid communication to a first portion of said interior chamber, a second plastic melt feed means attached to said housing means and providing a fluid communication to a second portion of said interior chamber, said first and second portions being at approximately radially opposed positions within said chamber, means supplying a plastic melt to said first and second melt feed means, and an adjustable guide means positioned in said housing means along a central axis thereof between said first and second portions of said interior chamber in surface contact with at least portions of said interior peripheral walls to segment said chamber into two distinct melt flow passageways extending substantially parallel with said outer slots, said guide means having guide surfaces positioned generally perpendicularly to said longitudinal axes of said outlet slot, said melt passageways guiding the plastic melts from said first and second melt feed means in adjacent contiguous flow streams along said die means and toward said outlet slot whereby the plastic melt from said first melt feed means forms a substantially uniform layer and the plastic melt from said second melt feed means forms another uniform layer of a multi-layer composite film.

10. An end-feed die plug means as defined in claim 9 wherein the first and second portions are substantially parallel to a radial axis of the guide surfaces and include oppositely offset guide portions extending into the interior chamber so as to direct the plastic melts from the first melt feed means toward one peripheral surface of the interior chamber and direct the plastic melt from the second melt feed means toward an opposed peripheral surface of said interior chamber.

11. In a plastic extrusion apparatus having a plastic melt supply means and an end-feed die means having an outlet slot extending in a cross-machine direction and having a longitudinal axis parallel to said direction for extruding a multi-layer composite film of a width commensurate with said outlet slot and of a desired thickness, the combination of:
an inlet block member attached to said supply means for directing melt toward said die means, comprising, a housing means having an interior inlet chamber, a plurality of melt feed means positioned within said housing means and providing a fluid intercommunication between said melt supply means and said inlet chamber, a first outlet means positioned within said housing means and providing a fluid intercommunication between said inlet chamber and said die means, said first outlet means providing a relatively elongated melt flow path substantially commensurate with said outlet and extending substantially parallel with said longitudinal axes thereof, and a second outlet means positioned within said housing means and providing fluid intercommunication between said inlet chamber and said die means, said second outlet means providing a relatively short melt flow path defining an acute angle with said elongated flow path and extending downwardly toward said outlet slot whereby plastic melt passing through said second outlet means reaches said die means prior to the plastic melt passing through said first outlet means, and an end-feed die plug means attached between said inlet block member and said die means, said plug means comprising a housing means having interior peripheral walls defining an interior chamber providing fluid intercommunication between said first and second outlet means and an inlet end of said die means, said first outlet means communicating with a first portion of said plug means interior chamber and said second outlet means communicating with a second portion of said plug means interior chamber, said first and second portions being spaced apart from one another along the periphery of said plug means interior chamber, and a guide means positioned within said plug means interior chamber and between said first and second portions thereof in surface contact with at least portions of said interior peripheral walls to segment said plug means interior chamber into at least two distinct melt flow passageways, said flow passageways guiding the melts from said first and second outlet means in adjacent contiguous flow streams along the width of said die means whereby the melt from the first outlet means forms a first substantially uniform layer and the melt from the second outlet means forms a second substantially uniform layer of a multi-layer composite film.

12. An apparatus for extruding a multi-layer composite plastic film, comprising, a first melt supply means feeding a plastic melt at a predetermined volume flow rate, a second melt supply means feeding a plastic melt at a predetermined volume flow rate, an inlet block means attached to said first and second supply means, said inlet block having interior peripheral walls defining an inlet block interior chamber and a first and a second inlet block flow passageway in fluid communication with said first and second melt supply means respectively and with substantially opposed portions of said inlet block interior chamber so as to conduct the plastic melt from said supply means to said opposed interior chamber portions an elongated die means attached adjacent to said inlet block means and having an outlet slot of a given width extending in a cross-machine direction, said die means adapted to be in fluid communication with said inlet block interior chamber, a first inlet block outlet means in fluid communication with said inlet block interior chamber and said die means, said first inlet block outlet means defining a relatively elongated melt flow path toward said outlet slot extending from said inlet block interior chamber to said die means along the elongated dimension thereof, a second inlet block outlet means in fluid communication with said inlet block interior chamber and said die means, said second inlet block outlet means defining a relatively short melt flow path extending downwardly toward said outlet slot and positioned to define an acute angle with said elongated flow path, and a guide means mounted on said inlet slot adjacently between said first and second block outlet means and adapted to be in fluid communication with said die means, said guide means having generally divergent guide surfaces in surface contact with at least portions of said interior peripheral walls and extending toward said die means and generally parallel with said outlet slots so as to divided each of said melt flow paths into three distinct melt flow sub-paths extending substantially parallel with said outlet slot, said divergent guide surfaces being positioned to define an angle therebetween ranging from about 15° to 135°, said melt flow sub-paths guiding melt from said first and second supply means in adjacent contiguous streams into said die means and along the width of said outlet slot whereby a three-layer composite film having substantially uniform layers throughout its width is formed.

References Cited

UNITED STATES PATENTS

| | | | |
|---|---|---|---|
| 2,985,556 | 5/1961 | Rowland | 18—13(P)UX |
| 3,415,920 | 12/1968 | Lee et al. | 18—13(P)X |
| 3,448,183 | 6/1969 | Chisholm | 18—13(P)X |

H. A. KILBY, JR., Primary Examiner